United States Patent
Lee et al.

(10) Patent No.: US 10,949,376 B2
(45) Date of Patent: Mar. 16, 2021

(54) COMMUNICATION CONTROL METHOD AND ELECTRONIC DEVICE SUPPORTING SAME

(71) Applicant: Samsung Electronics Co., Ltd., Suwon-si (KR)

(72) Inventors: Soon Ho Lee, Seoul (KR); Guneet Singh Khurana, Suwon-si (KR); Woo Kwang Lee, Suwon-si (KR); Yong Seok Jang, Suwon-si (KR); Bu Seop Jung, Suwon-si (KR); Doo Suk Kang, Suwon-si (KR); Min Jung Kim, Hwaseong-si (KR); Bo Kun Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/758,149

(22) PCT Filed: Oct. 22, 2018

(86) PCT No.: PCT/KR2018/012470
§ 371 (c)(1),
(2) Date: Apr. 22, 2020

(87) PCT Pub. No.: WO2019/083233
PCT Pub. Date: May 2, 2019

(65) Prior Publication Data
US 2020/0285601 A1    Sep. 10, 2020

(30) Foreign Application Priority Data
Oct. 23, 2017    (KR) .................. 10-2017-0137446

(51) Int. Cl.
G06F 13/42    (2006.01)
H04W 4/80    (2018.01)
(Continued)

(52) U.S. Cl.
CPC .......... *G06F 13/4282* (2013.01); *H04L 47/25* (2013.01); *H04W 4/80* (2018.02); *G06F 2213/0042* (2013.01); *H04W 84/12* (2013.01)

(58) Field of Classification Search
CPC ........ G06F 13/4282; G06F 2213/0042; H04W 4/80; H04W 84/12; H04L 47/26
See application file for complete search history.

(56) References Cited

U.S. PATENT DOCUMENTS 9,357,357 B2    5/2016  Ding et al.
9,374,402 B2    6/2016  Sadeghi et al.
(Continued)

FOREIGN PATENT DOCUMENTS

JP           6111817 B2    4/2017
KR    10-2013-0113203 A   10/2013
(Continued)

OTHER PUBLICATIONS

ISA/KR, International Search Report and Written Opinion of the International Searching Authority, International Application No. PCT/KR2018/012470, Jan. 25, 2019, 13 pages.

*Primary Examiner* — Henry Tsai
*Assistant Examiner* — Christopher A Daley

(57) ABSTRACT

An electronic device is disclosed that includes a housing, a universal serial bus (USB) connector exposed through one region of the housing, a wireless communication circuitry supporting short-range wireless communication, at least one processor electrically connected with the USB connector and the wireless communication circuitry, and a memory electrically connected with the processor. The memory stores instructions, when executed, causing the at least one processor to, while the USB connector is connected with a first external device and while the wireless communication circuitry performs wireless communication with a second external device, determine a wired communication state (Continued)

with the first external device through the USB connector and adjust a power saving scheme for the wireless communication based at least in part on the determined state. In addition, various embodiments recognized through the specification are possible.

15 Claims, 10 Drawing Sheets

(51) Int. Cl.
*H04L 12/825* (2013.01)
*H04W 84/12* (2009.01)

(56) References Cited

U.S. PATENT DOCUMENTS

| | | | |
|---|---|---|---|
| 9,483,121 B2 * | 11/2016 | Shaffer | G06F 3/0416 |
| 9,628,568 B2 | 4/2017 | Sadeghi et al. | |
| 9,633,039 B2 * | 4/2017 | Stanzione | H04M 7/0027 |
| 9,642,092 B2 * | 5/2017 | Yokoyama | H04L 1/0015 |
| 9,923,935 B2 | 3/2018 | Sadeghi et al. | |
| 10,430,734 B2 * | 10/2019 | Kneckt | H04W 52/0235 |
| 2011/0131386 A1 * | 6/2011 | Okutsu | G06F 13/102 |
| | | | 711/163 |
| 2011/0188391 A1 * | 8/2011 | Sella | H04L 67/1051 |
| | | | 370/252 |
| 2011/0292445 A1 * | 12/2011 | Kato | H04N 1/00222 |
| | | | 358/1.15 |
| 2013/0268789 A1 | 10/2013 | Yang | |
| 2014/0235164 A1 * | 8/2014 | Vaucher | H02J 50/80 |
| | | | 455/41.1 |
| 2014/0321292 A1 | 10/2014 | Yokoyama | |
| 2014/0344463 A1 | 11/2014 | Sadeghi et al. | |
| 2015/0110090 A1 | 4/2015 | Ding et al. | |
| 2015/0249616 A1 | 9/2015 | Lee et al. | |
| 2016/0212217 A1 | 7/2016 | Sadeghi et al. | |
| 2016/0285645 A1 | 9/2016 | Kim et al. | |
| 2017/0195371 A1 | 7/2017 | Sadeghi et al. | |

FOREIGN PATENT DOCUMENTS

| | | |
|---|---|---|
| KR | 10-2014-0049272 A | 4/2014 |
| KR | 10-2016-0074615 A | 6/2016 |
| KR | 10-1717005 B1 | 3/2017 |

* cited by examiner

| DEVICE ATTRIBUTES | USE TYPE | USB Speed | Bus Rate |
|---|---|---|---|
| Human Interface Device(HID) | Keyboard, mouse, joystick | Low-Speed | 15 Mbps |
| Mass Storage Device (MSD) | External hard drives, flash drives, memory cards | Hi-Speed | 480 Mbps |
| Communication Device Class(CDC) | Modem, ethernet adapter, Wi-Fi adapter | Super Speed | 10 Gbps |
| Vendor(Vendor Specific) | Indicates a device needs vendor specific drivers | - | - |
| Audio | Speaker, microphone, sound card, MIDI | Full-Speed | 12 Mbps |
| Image | Camera, scanner | Hi-Speed | 480 Mbps |
| Printer | Printers, CNC machine | Hi-Speed | 480 Mbps |
| Diagnostic Device | USB compliance testing device | Full-Speed | 12 Mbps |
| Video | Webcam | Hi-Speed | 480 Mbps |
| Video | HD Video | Super Speed | 10 Gbps |

Table 3:

| THE AMOUNT OF POWER CONSUMPTION AT TIME BEFORE NOA CONTROL | WIRELESS COMMUNICATION RATE ACCORDING TO NOA CONTROL | THE AMOUNT OF POWER CONSUMPTION AT TIME AFTER NOA CONTROL | POWER CONSUMPTION SAVING RATIO |
|---|---|---|---|
| 209.26 mA | 10 Mbps | 209.26 mA | -25.5% |
| 297.42 mA | 50 Mbps | 297.42 mA | -23.5% |
| 388.49 mA | 100 Mbps | 388.49 mA | -10.6% |
| 549.69 mA | 200 Mbps | 549.69 mA | -8.7% |
| 758.75 mA | 300 Mbps | 758.75 mA | -4.4% |

Table 5:

| THE AMOUNT OF POWER CONSUMPTION AT TIME BEFORE NOA CONTROL | WIRELESS COMMUNICATION RATE ACCORDING TO NOA CONTROL | THE AMOUNT OF POWER CONSUMPTION AT TIME AFTER NOA CONTROL | POWER CONSUMPTION SAVING RATIO |
|---|---|---|---|
| 186.33 mA | 10 Mbps | 124.69 mA | -33.1% |
| 239.10 mA | 50 Mbps | 167.37 mA | -30.0% |
| 268.64 mA | 100 Mbps | 210.56 mA | -21.6% |
| 319.31 mA | 200 Mbps | 254.85 mA | -20.2% |

COMMUNICATION CONTROL METHOD AND ELECTRONIC DEVICE SUPPORTING SAME

CROSS-REFERENCE TO RELATED APPLICATIONS

This application is a 371 National Stage of International Application No. PCT/KR2018/012470, filed Oct. 22, 2018, which claims priority to Korean Patent Application No. 10-2017-0137446, filed Oct. 23, 2017, the disclosures of which are herein incorporated by reference in their entirety.

BACKGROUND

1. Field

The disclosure relates to communication control technologies in Wi-Fi serial bus (WSB) communication environment.

2. Description of Related Art

In response to the rapid development of the information communication industry, various network platforms for providing high-quality communication services have been established. For example, a Wi-Fi direct (or Wi-Fi peer to peer) technology, loaded into an electronic device, for performing direct communication has been proposed. The Wi-Fi direct technology may exclude a separate configuration such as an access point or a router and may support data transmission and reception between devices performing Wi-Fi direct through a relatively simple process.

When the compatibility of a high layer is not satisfied between the devices performing Wi-Fi direct, it is impossible to provide a normal communication service. Thus, recently, Wi-Fi serial bus (WSB) communication scheme based on Wi-Fi direct technology has been introduced.

SUMMARY

An electronic device supporting WSB communication may perform wired communication and wireless communication with a plurality of external devices related to a WSB communication environment. For example, the electronic device may be connected with a first external device through wired communication, and may be connected with a second external device through wireless communication. However, when operation environments (e.g., communication rates) do not correspond between the wired communication and the wireless communication, the power of the electronic device may be inefficiently consumed by any one communication operation. This may result in attenuated available power of the electronic device.

Various embodiments of the disclosure may provide a communication control method for controlling an electronic device such that a state of wired communication and a state of wireless communication state correspond to each other upon WSB communication operation to save the amount of power consumption of the electronic device supporting the WSB communication and an electronic device supporting the same.

Technical Solution

In accordance with an aspect of the disclosure, an electronic device is provided. The electronic device may include a housing, a universal serial bus (USB) connector exposed through one region of the housing, a wireless communication circuitry supporting short-range wireless communication, at least one processor electrically connected with the USB connector and the wireless communication circuitry, and a memory electrically connected with the processor.

According to an embodiment, the memory may store instructions, when executed, causing the at least one processor to, while the USB connector is connected with a first external device and while the wireless communication circuitry performs wireless communication with a second external device, determine a wired communication state with the first external device through the USB connector and adjust a power saving scheme for the wireless communication based at least in part on the determined state.

Advantageous Effects

According to various embodiments, power consumption of the electronic device supporting WSB communication may be reduced and available power may be efficiently managed, by controlling such that a plurality of communication involved in a WSB communication environment correspond to each other.

According to various embodiments, the electronic device may control wireless communication based at least in part on a wired communication state in performing communication with a plurality of external devices, thus saving the amount of power consumption of the electronic device.

In addition, various effects directly or indirectly ascertained through the disclosure may be provided.

BRIEF DESCRIPTION OF THE DRAWINGS

FIG. 5A is a drawing illustrating an exemplary form of descriptor information obtained by an electronic device according to an embodiment;

FIG. 6 is a drawing illustrating various data for the amount of power consumption reduced upon NOA control of an electronic device according to an embodiment;

DETAILED DESCRIPTION

Figure 1:
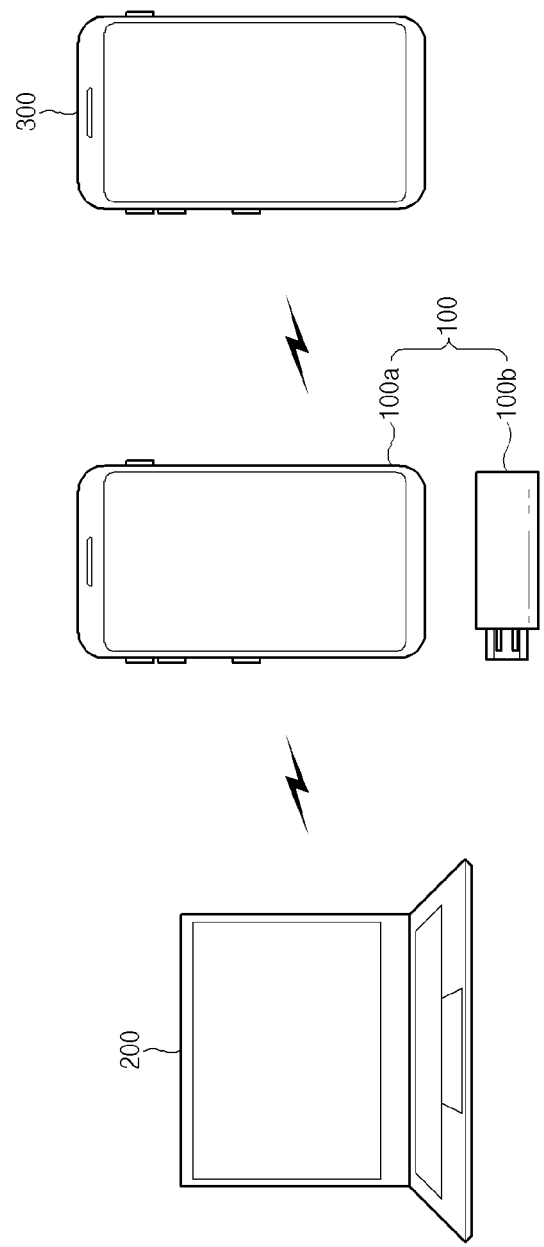
FIG. 1 is a drawing illustrating a communication environment of an electronic device according to an embodiment.

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure. With regard to description of drawings, similar components may be marked by similar reference numerals.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 is a drawing illustrating a communication environment of an electronic device according to an embodiment.

Referring to FIG. 1, an electronic device 100 may be electrically or communicatively connected and interact with at least one external device. For example, the electronic device 100 may establish a wired connection (e.g., a USB communication connection) with a first external device 200 based on a specified interface (e.g., a USB connector, a USB port, a USB cable, or the like) and may establish a wireless connection (e.g., a Wi-Fi communication connection) with a second external device 300 based on a wireless communication circuitry. In this case, the electronic device 100 may support communication between the first external device 200 and the second external device 300 using a Wi-Fi serial bus (USB) communication mode. The WSB communication may be, for example, a part of a network based on Wi-Fi direct and a media agnostic-USB (MA-USB) protocol, and the first external device 200 wiredly connected to the electronic device 100 may provide a service platform based on wired communication to the second external device 300 wirelessly connected to the electronic device 100. For example, the USB communication supported by the electronic device 100 may support the first external device 200 to recognize being wiredly connected with the second external device 300 (or support the second external device 300 to recognize being wiredly connected with the first external device 200).

According to an embodiment, the electronic device 100 (e.g., 100b) may include an external connection device capable of supporting complex operation of wired communication (e.g., USB communication) and wireless communication (e.g., Wi-Fi communication) (e.g., a dongle which is connected to an input/output interface of the first external device 200 to support an additional function). Alternatively, the electronic device 100 (e.g., 100a) may include a portable device, a smart device, or the like, which is mounted with a wired and wireless communication function. Herein, the electronic device 100 is not limited thereto, which may include various types of devices or apparatuses capable of supporting the WSB communication.

In conjunction with performing wired communication (e.g., USB communication) with the electronic device 100, the first external device 200 may control the wired communication on an overall basis or may function as a host device which is an entity of the wired communication. The second external device 300 may establish a wireless communication channel with the electronic device 100 through a specified communication band and may perform encrypted wireless communication (e.g., Wi-Fi communication). In an embodiment, the second external device 300 may be included in at least one peer to peer (P2P) group which establishes Wi-Fi P2P with the electronic device 100, in performing the wireless communication. In this regard, the electronic device 100 or the second external device 300 may function as a group owner in the P2P group or may function as a group client.

In an embodiment, upon operation of the WSB communication, the electronic device 100 may control such that wired communication and wireless communication corresponds to each other, on the basis of any one of the wired communication (e.g., the USB communication) and the wireless communication (e.g., the Wi-Fi communication). For example, the electronic device 100 may control the wireless communication to correspond to an operation environment of the wired communication (e.g., a rate of the wired communication), with reference to at least one information source associated with the wired communication. As a part thereof, for example, a power saving scheme may be controlled. Thus, the electronic device 100 may remove unnecessary power consumption capable of being involved in performing the wireless communication (e.g., power consumption capable of being generated because of performing the wireless communication which does not correspond to the operation environment of the wired communication). Based on it, the electronic device 100 may optimize power management to efficiently manage available power for operation of another function. Hereinafter, various embodiments of communication control associated with operation of the WSB communication and function operations of the electronic device 100 implementing it will be described with reference to the accompanying drawings.

Figure 2A:
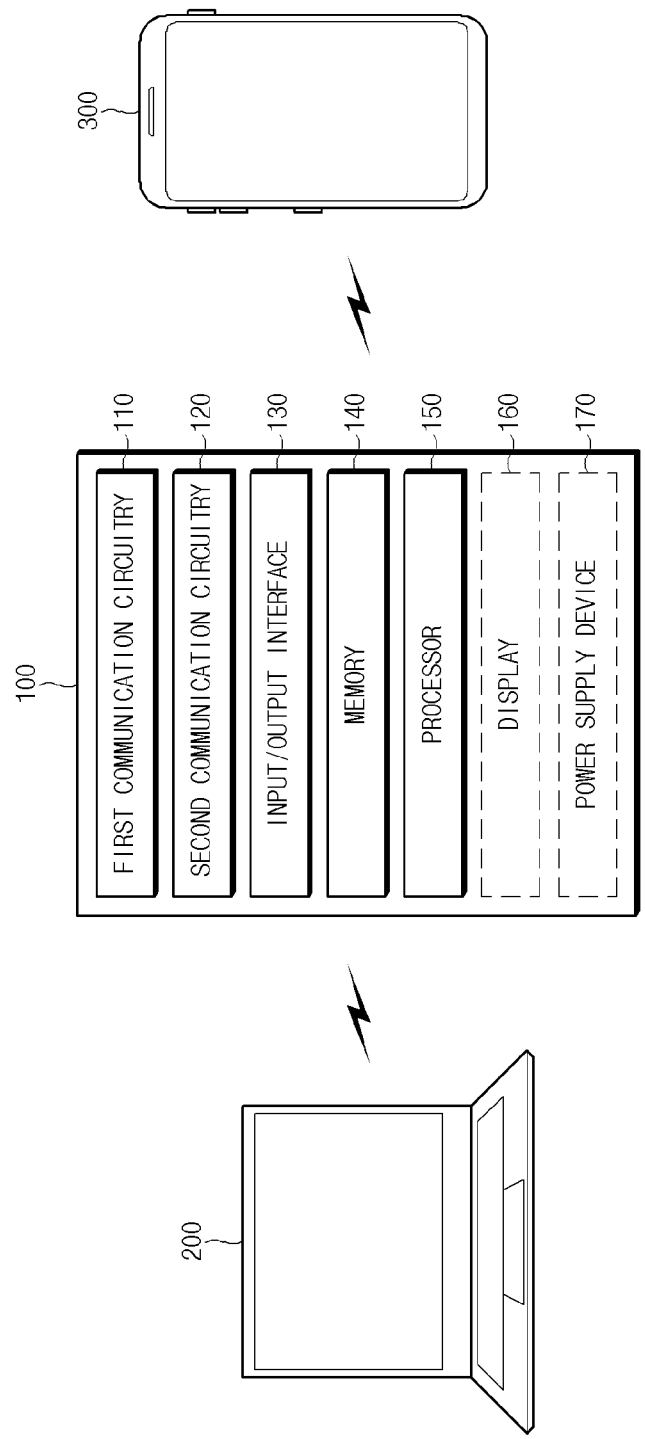
FIG. 2A is a drawing illustrating a configuration of an electronic device according to an embodiment.
Figure 2B:
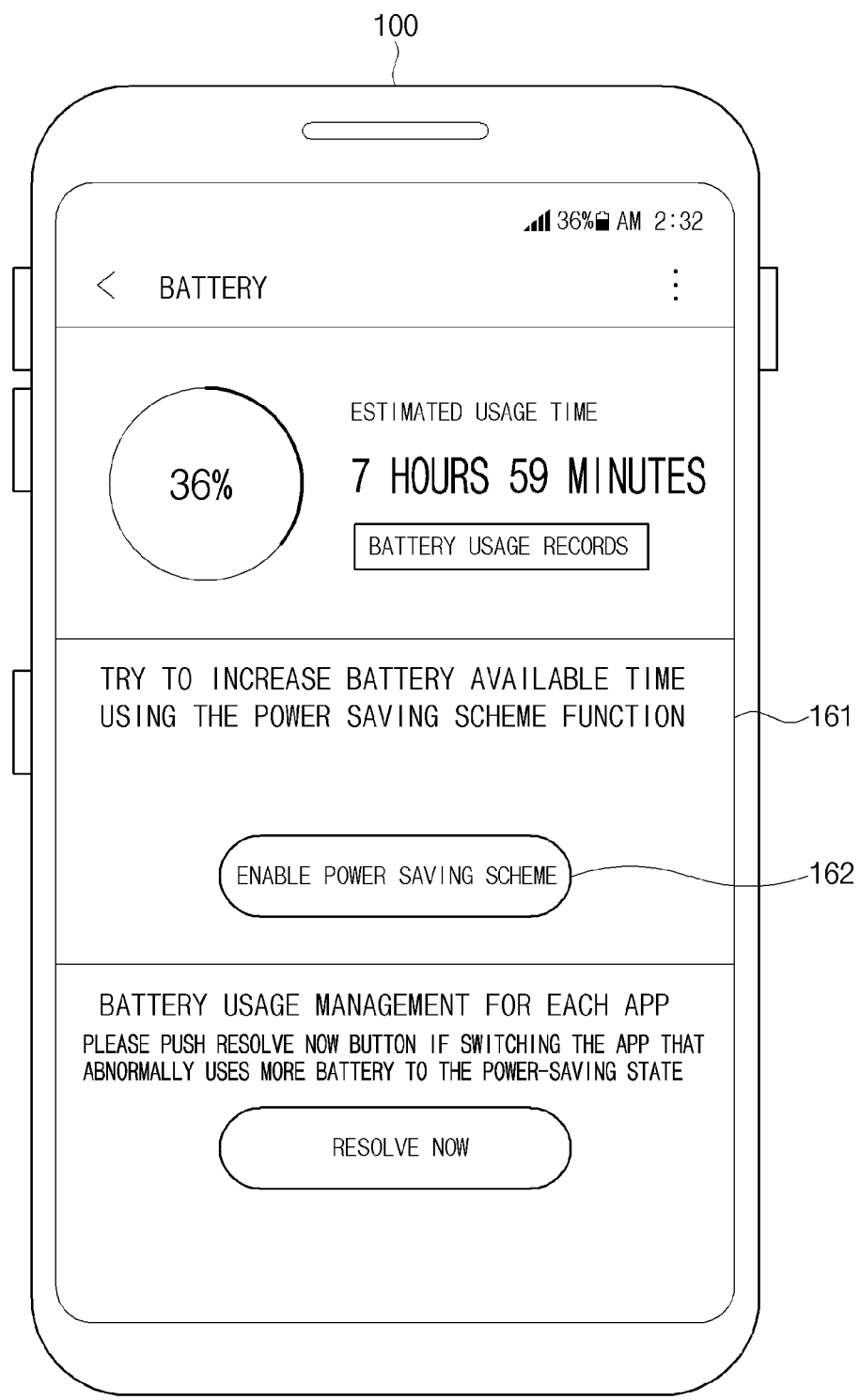
FIG. 2B is a drawing illustrating a function operation by some components of an electronic device according to an embodiment.

FIG. 2A is a drawing illustrating a configuration of an electronic device according to an embodiment. FIG. 2B is a drawing illustrating a function operation by some components of an electronic device according to an embodiment.

Referring to FIG. 2A, an electronic device 100 may include a first communication circuitry 110, a second communication circuitry 120, an input/output interface 130, a memory 140, or a processor 150. In various embodiments, the electronic device 100 may exclude at least one of the above-mentioned components or may additionally include another component. For example, the electronic device 100 may further include a housing (not shown), a display 160, or a power supply device 170. The housing may implement at least a portion of the appearance of the electronic device 100. At least some components of the electronic device 100 may be arranged in the housing or may be arranged on the housing.

The display 160 may output a variety of content. For example, when communication based on the first communication circuitry 110 or the second communication circuitry 120 is performed, the display 160 may output various information resources (e.g., communication identification information, communication attribute information, or the like) related to the communication. In controlling such that the above-mentioned wired communication (e.g., the USB communication) and the wireless communication (e.g., the Wi-Fi communication) corresponds to each other, the display 160 may output a screen interface capable of receiving a control input or signal related to power management of the electronic device 100 from a user. In this regard, referring to FIG. 2B, when performing wired communication and wireless communication according to the WSB communication between the electronic device 100 and at least one external device (e.g., a first external device 200 and a second external device 300), the processor 150 may control the display 160 to output an interface 161 associated with setting a function of the power supply device 170 (or a battery). For example, the processor 150 may output the interface 161 when a USB communication protocol between the electronic device 100 and at least one external device (e.g., the first external device 200 and the second external device 300) is used for the first time (or when wired communication and wireless communication are performed for the first time) or may output the interface 161 whenever the WSB communication protocol is used. Alternatively, the processor 150 may output the interface 161, when an amount of available power of the electronic device 100 is less than or equal to a specified threshold amount at a time when the WSB communication protocol is used or when a size of data to be transmitted using the WSB communication protocol is greater than or equal to a specified size. According to an embodiment, the interface 161 may display at least one content associated with power management of the power supply device 170 and may include, for example, an object 162 (e.g., a tab, a button, or the like) capable of controlling activation of a power saving scheme function associated with power management optimization of the electronic device 100 for use of the USB communication protocol.

The power supply device 170 may be electrically connected with components of the electronic device 100 to supply driving power.

The first communication circuitry 110 and the second communication circuitry 120 may support communication between the electronic device 100 and at least one external device (e.g., the first external device 200 and the second external device 300). For example, the first communication circuitry 110 and the second communication circuitry 120 may establish communication according to a defined protocol with at least one external device (e.g., the first external device 200 and the second external device 300), and may perform transmission and reception of data by interacting with the external device (e.g., the first external device 200 and the second external device 300) through the communication. In an embodiment, the first communication circuitry 110 may support wired communication (e.g., USB communication) with a first external device (e.g., the first external device 200) based on the input/output interface 130 described below, and the second communication circuitry 120 may support wireless communication (e.g., Wi-Fi communication) with a second external device (e.g., the second external device 300) which is adjacent (is present within a specified region range).

The input/output interface 130 may support transmission and reception of data or a signal between the electronic device 100 and an external device (e.g., the first external device 200). For example, the input/output interface 130 may deliver data or a signal, input from the external device (e.g., the first external device 200), to at least some components of the electronic device 100 or may output data or signals, provided from at least some components of the electronic device 100, to the external device (e.g., the first external device 200). In an embodiment, the input/output interface 130 may include a cable, a connector, or a port, which supports wired communication (e.g., USB communication) with the external device (e.g., the first external device 200).

The memory 140 may store at least one data or information resource involved in operation of WSB communication or may store a command associated with a function operation of the electronic device 100. For example, the memory 140 may store a communication related information resource (e.g., communication identification information, communication attribute information, or the like) obtained from at least one external device (e.g., the first external device 200 and the second external device 300) in conjunction with WSB communication operation of the electronic device 100. Alternatively, in various embodiments, when the electronic device 100 relays data transmission and reception between the at least one external device (e.g., the first external device 200 and the second external device 300), the memory 140 may store and manage data received from any external device (e.g., the first external device 200 or the second external device 300).

The processor 150 may be electrically or operatively connected with at least one component of the above-mentioned electronic device 100 to perform control, communication, calculation, data processing, or the like of the component. For example, the processor 150 may control wired communication and wireless communication between the electronic device 100 and at least one external device (e.g., the first external device 200 and the second external device 300), based on control of the first communication circuitry 110 and the second communication circuitry 120. In this operation, the processor 150 may control such that operation environments of the wired communication and the wireless communication corresponds to each other, in conjunction with WSB communication support of the electronic device 100 for the at least one external device (e.g., the first external device 200 and the second external device 300). For example, the processor 150 may obtain an information resource related to wired communication from the first external device (e.g., the first external device 200) which performs wired communication with the electronic device 100 and may control attributes (e.g., a notice of absence (NOA), a communication rate, or the like) for wireless communication performed with the second external device (e.g., the second external device 300), based on at least a portion of the information resource. Function operations of the processor 150, associated with it, will be described below.

Figure 3:
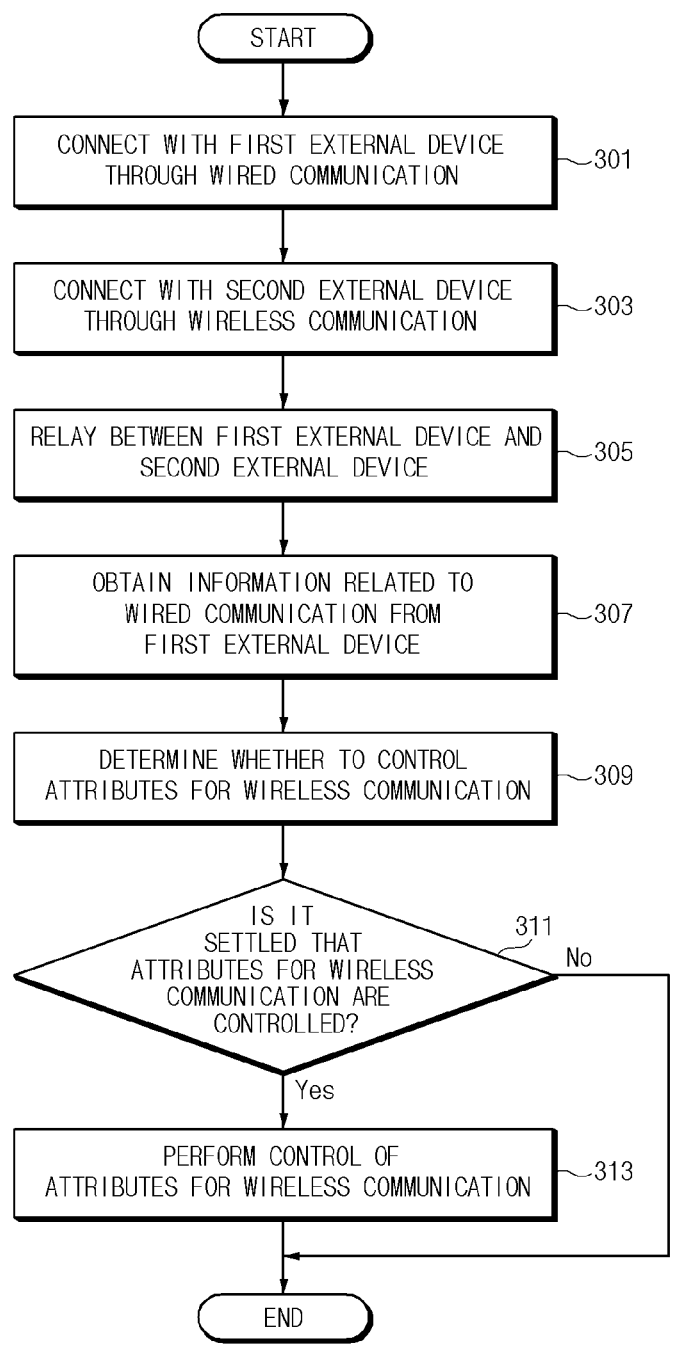
FIG. 3 is a drawing illustrating a communication control method of an electronic device according to an embodiment.

FIG. 3 is a drawing illustrating a communication control method of an electronic device according to an embodiment.

Referring to FIG. 3, in operation 301, an electronic device (an electronic device 100 of FIG. 2A) may perform a wired communication connection operation with a first external device (a first external device 200 of FIG. 2A). For example, the electronic device 100 may be physically connected with the first external device 200 based on an input/output interface (e.g., an input/output interface 130 of FIG. 2A), and may perform wired communication (e.g., USB communication) with the first external device 200 by control of a processor (e.g., a processor 150 of FIG. 2A) for a first communication circuitry (a first communication circuitry 110 of FIG. 2A). When the electronic device 100 is physically connected with the first external device 200, for example, it may receive power (e.g., 5 V) from the first external device 200, and components of the electronic device 100 may be driven or activated based on it. In various embodiments, when the electronic device 100 is loaded with a separate power supply device (e.g., a power supply device 170 of FIG. 2A), the above-mentioned power supply from the first external device may be excluded. Furthermore, in various embodiments, upon the physical connection, the electronic device 100 capable of functioning as a hub device for the wired communication may be recognized by the first external device 200 capable of functioning as a host device of the wired communication. In this case, the first external device 200 may activate a class driver (e.g., a hub class driver) corresponding to the recognized electronic device 100. The above-mentioned role of the electronic device 100 (e.g., the hub device of the wired communication) and the role of the first external device 200 (e.g., the host device of the wired communication) are according to various embodiments, and the disclosure is not limited thereto. The roles of the electronic device 100 and the second external device 200 are interchangeable, or may function as another role associated with operating wired communication.

In operation 303, the electronic device 100 may perform a wireless communication connection with a second external device (a second external device 300 of FIG. 2A). In an embodiment, a processor 150 of the electronic device 100 may discover the second external device 300, which is adjacent (or is present within a specified region range), through a specified communication band. The processor 150 may generate a Wi-Fi direct group for at least one external device or may allow the electronic device 100 to function as a group owner (e.g., Wi-Fi direct autonomous GO) using an existing Wi-Fi direct group, and may include the discovered second external device 300 in the Wi-Fi direct group. The processor 150 may establish a communication channel with the second external device 300 included in the Wi-Fi direct group and may connect wireless communication (e.g., Wi-Fi communication), thus completing a WSB session setup operation including a series of the above-mentioned processes (e.g., discovering the second external device 300, including the second external device 300 in the Wi-Fi direct group, connecting the wireless communication with the second external device 300, and the like). In various embodiments, The WSB session setup may include an operation where the processor 150 sets a notice of absence (NOA) schedule for at least one external device included in the Wi-Fi direct group.

In various embodiments, when it is unnecessary to supply power from an external device (e.g., the first external device 200) because the electronic device 100 includes the power supply device 170, the above-mentioned operation 303 may be performed at a time before operation 301 is performed or at a time similar to that when operation 301 is performed. For example, the electronic device 100 may perform the WSB session setup with the second external device 300 to connect with the second external device 300 through wireless communication and may connect with the first external device 200 through wired communication based on an input/output interface 130, thus supporting communication between the first external device 200 and the second external device 300 according to operation of WSB communication.

In operation 305, the electronic device 100 may relay between the first external device 200 and the second external device 300. For example, the processor 150 of the electronic device 100 may receive data from the first external device 200 connected to the electronic device 100 through wired communication and may transmit the received data to the second external device 300 connected to the electronic device 100 through wireless communication.

Similar to the recognition of the first external device 200 for the above-mentioned electronic device 100, the first external device 200 may recognize the second external device 300 as a device according to wired communication (e.g., USB communication) via the electronic device 100. For example, the first external device 200 may obtain information about the second external device 300 via the electronic device 100 and may allocate and activate a class driver or an address corresponding to the second external device 300 based on the obtained information. Alternatively, the first external device 200 may identify a data receiving or processing rate of the second external device 300 or may identify a max packet size of a default pipe, based on obtaining the information about the second external device 300.

In operation 307, the processor 150 of the electronic device 100 may obtain at least one information resource related to wired communication (e.g., USB communication). For example, the processor 150 may obtain at least a portion of at least one descriptor information (e.g., a device descriptor, a configuration descriptor, an interface descriptor, an endpoint descriptor, or the like) related to wired communication with the first external device 200 depending on specified scheduling information. The scheduling information may include, for example, a monitoring operation (e.g., check the amount of data transmission or reception or the like) during a specified time with respect to a function operation of the first external device 200.

In an embodiment, the processor 150 may identify a rate type (e.g., low, full, high, or super), an endpoint type (e.g., control, bulk, isochronous, interrupt transfer, or the like), an input/output interface type of the first external device 200, device class information defined by an input/output interface of the first external device 200, the amount of data transmission, the amount of data reception, or the like, with respect to the first external device 200 or wired communication with the first external device 200 based on the obtained descriptor information.

In an embodiment, the descriptor information may be understood as information related to wired communication between the first external device 200 and the electronic device 100. Alternatively, the descriptor information may be understood as information related to communication between the first external device 200 and the second external device 300, which are wirelessly connected therebetween, but are recognized as being wiredly connected, as the electronic device 100 relays between the first external device 200 and the second external device 300.

In various embodiment, the obtaining of the descriptor information of the processor 150 may be performed in an operation (e.g., operation 301) where the electronic device 100 is recognized by the first external device 200 or an operation (e.g., operation 305) where the first external device 200 recognizes the second external device 300, other than the monitoring operation for the function operation of the first external device 200. In various embodiments, the processor 150 may obtain the above-mentioned wired communication related information based on packet information of data in an operation of relaying the data between the first external device 200 and the second external device 300.

In operation 309, the processor 150 may determine whether to control attributes for wireless communication (e.g., Wi-Fi communication) performed between the electronic device 100 and the second external device 300. For example, the processor 150 may determine whether to control the attributes for the wireless communication at a time when any data is transmitted and received between the first external device 200 and the second external device 300 based on the relaying of the electronic device 100. For another example, the processor 150 may receive and store any data from the first external device 200 in the memory (a memory 140 of FIG. 2) and may determine whether to control the attributes for the wireless communication at a time when the stored data is transmitted to the second external device 300.

In an embodiment, the processor 150 may calculate a wireless communication rate with reference to the amount of data transmission or reception per time in the wireless communication and may compare the wireless communication rate with a rate type of wired communication according to the descriptor information or a wired communication rate calculated in real time. As a result of the comparison, when the wireless communication rate is relatively faster than the wired communication rate, the processor 150 may determine to control the attributes for the wireless communication.

In operation 311, the processor 150 may determine whether it is settled that the determined control of the attributes for the wireless communication is performed. In this regard, the processor 150 may determine a type of the second external device 300 associated with wireless communication with reference to Wi-Fi direct group information capable of being obtained through the operation (e.g., operation 303) of performing the above-mentioned WSB session setup. In an embodiment, when the determined type of the second external device 300 includes a device, such as a mouse, a touch pad, or a keyboard, which is oriented toward real-time responsiveness, the processor 150 may exclude the determined control of the attributes for the wireless communication and may maintain existing attributes of wireless communication. In various embodiments, the processor 150 may settle that the determined control of the attributes for the wireless communication is performed, with regard to the amount of available power of the electronic device 100. For example, when the amount of available power of the electronic device 100 is greater than a specified threshold amount, the processor 150 may exclude the determined control of the attributes for the wireless communication. In various embodiments, the determination and settlement of performing the control of the attributes for the wireless communication, described above in operations 309 and 311, may be performed at substantially the same or similar time or may be performed sequentially.

When the determined type of the second external device 300 is not associated with the real-time responsiveness or when the amount of available power of the electronic device 100 is less than or equal to the specified threshold amount, in operation 313, the processor 150 may perform control of the attributes for the wireless communication. For example, the processor 150 may control a notice of absence (NOA), as an embodiment of the control of the attributes for the wireless communication.

TABLE 1

| Feild Name | Size(octets) | Value | Description |
| --- | --- | --- | --- |
| Attribute ID | 1 | 12 | Identifying the type of P2P attribute. |
| Length | 2 | n*(13) + 2 | Length of the P2P Notice of Absence attribute body in octets. |
| Index | 1 | 0-255 | Identifies an instance of Notice of Absence timing |
| CTWindow and OppPs Parameters | 1 | | Parameters indicating P2P Group Owner's availability window and opportunistic power save capability |
| Notice of Absence Descriptor(s) | n*13 | | Zero or more Notice of Absence Descriptors each defining a Notice of Absence timing schedule |

Table 1 above may represent an exemplary form of an NOA table (or an NOA frame) generated or constructed according to an embodiment.

In an embodiment, the processor 150 may generate the NOA table as a part of the control of the attributes for the wireless communication. For example, the processor 150 may generate the NOA table at a time when various information resources (e.g., communication identification information, communication attribute information, or the like) related to communication are received from the second external device 300 via the second communication circuitry 120. For another example, the processor 150 may generate the NOA table at a time when it is settled that the determined control of the attributes for the wireless communication is performed (e.g., when it is determined that the second external device 300 is not associated with the real-time responsiveness, when it is determined that the amount of available power of the electronic device 100 is less than or equal to the specified threshold amount, or the like). The processor 150 may transmit information associated with the NOA table to at least one external device (e.g., the second external device 300) in the Wi-Fi direct group to share a schedule for an NOA of wireless communication. For example, the processor 150 may include NOA descriptor information on the NOA table (e.g., information including absence timing of the electronic device 100 for wireless communication) in a beacon signal and may transmit the beacon signal to the second external device 300 over a specified period. When performing wireless communication, the processor 150 may perform absence during a first channel corresponding to a partial time range in a specified wireless communication period based on the NOA descriptor information. Receiving the beacon signal, the second external device 300 may operate in a doze state in response to the absence during the first channel time range, performed by the electronic device 100, depending on the NOA descriptor information included in the beacon signal. When based on it, the second external device 300 may fail to perform wireless communication with the electronic device 100, although it is in an active state during the first channel time range. In an embodiment, the processor 150 of the electronic device 100 may synchronize and manage attributes (e.g., a wireless communication rate or the like) for the wireless communication performed with the at least one external device by, as described above, transmitting the NOA descriptor information (or the beacon signal including the NOA descriptor information) to the at least one external device in the Wi-Fi direct group to share the NOA schedule of the wireless communication.

In various embodiments, the processor 150 may calculate absence timing which functions similar to the above-mentioned NOA descriptor information. In this regard, the processor 150 may derive an absence rate value based on a series of calculation formulas (e.g., (wireless communication rate– wired communication rate)/wireless communication rate). The processor 150 may share absence timing information about wireless communication according to the derived absence rate value with at least one external device in the Wi-Fi direct group and may synchronize attributes (e.g., a wireless communication rate or the like) for the wireless communication.

TABLE 2

| Field Name | Size(octets) | Value | Description |
| --- | --- | --- | --- |
| Count/Type | 1 | 1-255 | Count in Notice of Absence Descriptors sent by a P2P Group Owner; indicates the number of absence intervals. 255 shall mean a continuous schedule; 0 is reserved and shall not be used. Type in Notice of Absence Descriptors sent by a P2P Client in a P2P presence Request; qualifies the Duration and interval fields. A Type value of 1 shall indicate preferred values, a Type value of 2 shall indicate acceptable limits. |
| Duration | 4 | | In Notice of Absence Descriptors sent by a P2P Group Owner; indicates the maximum duration in units of microseconds that the P2P Group Owner can remain absent following the start of a Notice of Absence interval. In Notice of Absence Descriptors sent by a P2P Client in a P2P Present Request; indicates a preferred, or minimum acceptable presence period duration. |
| Interval | 4 | | In Notice of Absence Descriptors sent by a P2P Group Owner; |

TABLE 2-continued

| Field Name | Size(octets) | Value | Description |
|---|---|---|---|
| | | | indicates the length of the Notice of Absence interval in units of microseconds. In Notice of Absence Descriptors sent by a P2P Client in a P2P Present Request; indicates a preferred, or maximum acceptable interval between presence periods. |
| Start Time | 4 | | The start time for the schedule expressed in terms of the lower 4 bytes of the TSF timer. The Start Time field is reserved and shall be set to 0 on transmission and ignored on reception in Notice of Absence attributes transmitted by a P2P client. |

Table 2 above may represent an exemplary form of a parameter associated with an NOA according to an embodiment.

Referring to Table 2 above, seeing the NOA control of the electronic device 100 according to an embodiment, when the lower 4 bytes of a timing synchronization function (TSF) value of the electronic device 100 are identical to an NOA start time, the processor 150 may perform first absence corresponding to a partial duration of a wireless communication period specified in conjunction with performing wireless communication of the electronic device 100. While the first absence is performed, a second communication circuitry (the second communication circuitry 120 of FIG. 2) of the electronic device 100 may be controlled in a doze or power-saving state by the processor 150. The processor 150 may control wakeup of the second communication circuitry 120 at a time when the performance of the first absence is completed. When the TSF value of the electronic device 100 is identical to a time when a specified interval time elapses from the NOA start time, the processor 150 may perform second absence. In this regard, the interval time may be gradually increased in response to a count where specified absence is performed. As such, the processor 150 may perform absence for wireless communication by a specified count and may control an NOA, thus adjusting a wireless communication rate relatively faster than a rate of wired communication performed with the first external device 200 and saving power consumption of the electronic device 100 or the second external device 300, involved in performing the wireless communication. In various embodiments, when a count where the specified absence is performed is reached in conjunction with controlling the NOA or when a separate cancel input for controlling the NOA occurs from a user, the processor 150 may restore the NOA to a state before the control. Alternatively, when data transmission and reception based on wireless communication is not normally performed after the NOA is controlled or when the electronic device 100 is connected with a device (a mouse, a touch pad, a keyboard, or the like) which is oriented toward the above-mentioned real-time responsiveness, the processor 150 may restore the NOA to a state before the control.

As various embodiments of controlling the attributes for the above-mentioned wireless communication, the processor 150 may directly control a rate of wireless communication with the second external device 300 to correspond to a rate of wired communication with the first external device 200 or may control a bandwidth related to performing the wireless communication.

In various embodiments, when the electronic device 100 includes a power supply device 170, the NOA control, the rate control, or the bandwidth control for the wireless communication may variably adjust an absence time, a rate value, or a frequency range depending on the amount of available power of the electronic device 100.

Figure 4:
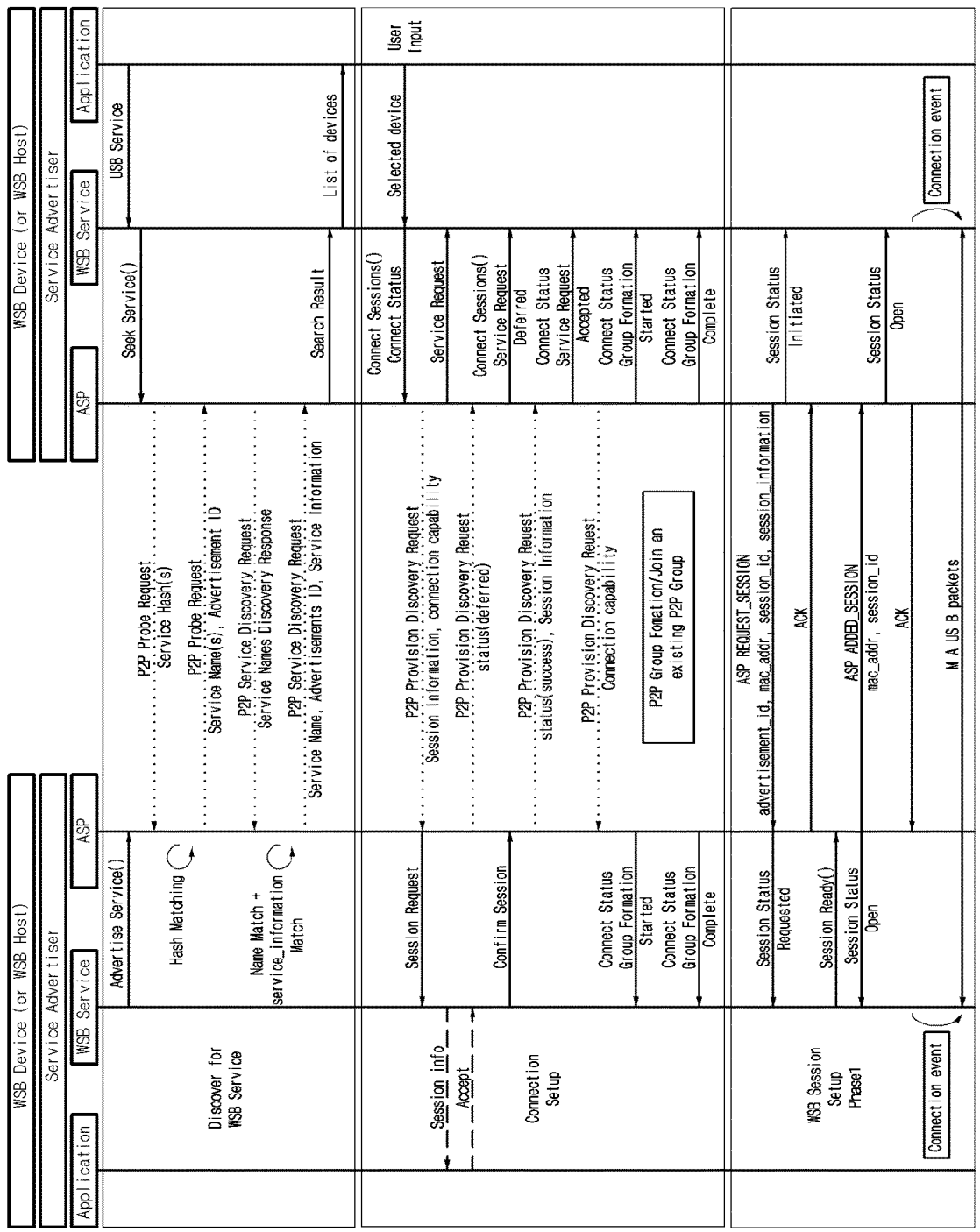
FIG. 4 is a drawing illustrating WSB session setup according to an embodiment.

FIG. 4 is a drawing illustrating WSB session setup according to an embodiment.

Referring to FIG. 4, a processor (150 of FIG. 2A) of an electronic device 100 may interact with a second external device 300 associated with performing wireless communication (e.g., Wi-Fi communication) of the electronic device 100 to perform WSB session setup. For example, the processor 150 may perform the WSB session setup including a first operation of discovering at least one external device (e.g., a second external device 300 of FIG. 2A) which operates a WSB communication service, a second operation of including the at least one discovered external device in a Wi-Fi direct group, or a third operation of connecting wireless communication with at least one external device in the Wi-Fi direct group.

In the first operation according to an embodiment, the processor 150 may receive information associated with the WSB communication service operated in the second external device 300 from the second external device 300. In this regard, the second external device 300 may transmit information (e.g., a service ID or the like) associated with the WSB communication service or identification information of the second external device 300 to an adjacent device (e.g., the electronic device 100 or the like) based on an application service platform (ASP) which supports Wi-Fi direct. The processor 150 of the electronic device 100 may transmit a request to connect wireless communication to an adjacent device (e.g., the second external device 300) and may receive a response according to the request from the adjacent device, thus identifying the second external device 300 which transmits the WSB communication service information and receiving the information associated with the WSB communication service.

In the second operation according to an embodiment, the processor 150 may include the second external device 300, discovered (or identified) in conjunction with connecting wireless communication between the electronic device 100 and at least one external device (e.g., the second external device 300), in the Wi-Fi direct group. In various embodiments, the Wi-Fi direct group may be newly generated in the second operation or may be previously generated in conjunction with a wireless communication function of the electronic device 100.

In the third operation according to an embodiment, the processor 150 may be connected with the second external device 300, included in the Wi-Fi direct group, through wireless communication. In this operation, the processor 150 may transmit a session request including parameter information for a session with the second external device 300, P2P connection type information, or transport type information (e.g., an IP, MAC, or the like) to the second external device 300 based on an ASP of the electronic device 100. The processor 150 and the second external device 300 may exchange packets for a session and may perform mutual recognition to be connected through wireless communication.

The above-mentioned WSB session setup process between the electronic device 100 and the second external device 300 is according to an embodiment, and the disclosure is not limited thereto. The WSB session setup may further include an additional operation, or at least some of the above-mentioned operations may be omitted.

Figure 5B:
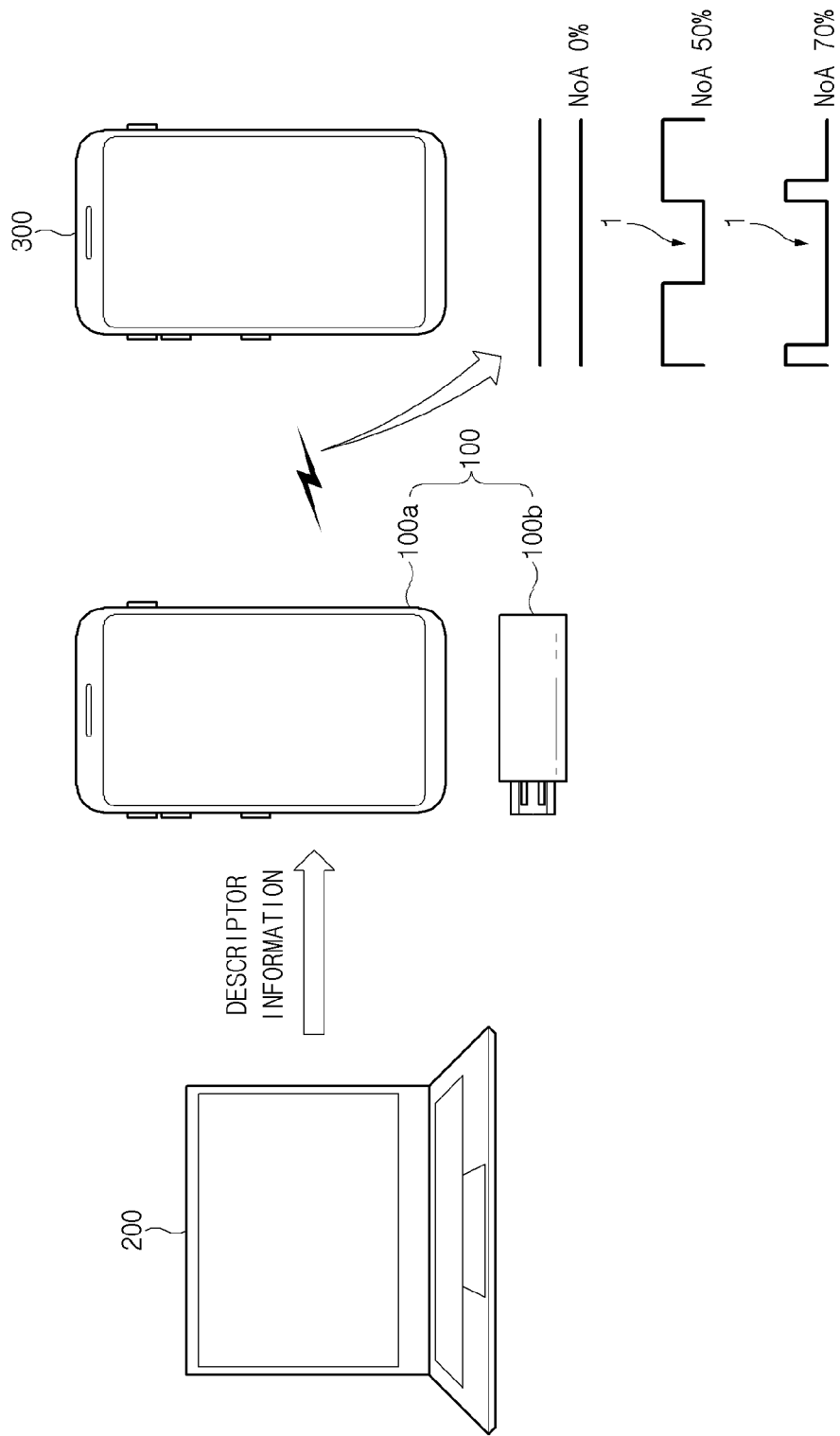
FIG. 5B is a drawing illustrating an NOA control form of an electronic device according to an embodiment.

FIG. 5A is a drawing illustrating an exemplary form of descriptor information obtained by an electronic device according to an embodiment. FIG. 5B is a drawing illustrating an NOA control form of an electronic device according to an embodiment.

Referring to FIGS. 5A and 5B, a processor (150 of FIG. 2A) of an electronic device (100 of FIG. 2A) may receive description information 500 related to wired communication from a first external device (200 of FIG. 2A) which performs the wired communication (e.g., USB communication) with the electronic device 100. In an embodiment, the description information 500 may include information of at least one device capable of performing wired communication with the first external device 200 and bus rate information 510 of wired communication capable of being maximally provided to each device.

In an embodiment, upon control of an NOA for wireless communication (e.g., Wi-Fi communication) performed between the electronic device 100 and a second external device (300 of FIG. 2A), the processor 150 may control absence involved in the control of the NOA, when a wireless communication rate between the electronic device 100 and the second external device 300 is faster than the bus rate information 510 according to attribute information 520 or device use information 530, which corresponds to the second external device 300 which performs wired communication with the device 200.

second external device 300, the processor 150 may perform absence involved in the NOA control. In this operation, as the wireless communication rate (e.g., 866.6 Mbps or the like) is faster than the bus rate information (e.g., 480 Mbps) supported by the first external device 200 (or as a difference between the bus rate information 510 and the wireless communication rate is larger), the processor 150 may increase a time or ratio (1) when the absence is performed.

In various embodiments, when at least one other device except for the electronic device 100 is connected to the first external device 200, the bus rate information 510, supported by the first external device 200, according to FIG. 5A, may be changed. Alternatively, when the first external device 200 or the electronic device 100 performs loaded another function operation except for the wired communication function, the bus rate information 510 supported by the first external device 200 may be changed.

In various embodiments, the processor 150 may perform NOA control with reference to the amount of data transmission or the amount of data reception for wired communication between the electronic device 100 and the first external device 200, which may be included in the description information 500, other than the above-mentioned bus rate information 510. In this regard, the processor 150 may calculate a data transmission rate or a data reception rate per unit time for wired communication based on the amount of data transmission or the amount of data reception. As a rate

TABLE 3

Modulation and Coding Schemes

| | | | | Data rate (in Mbit/s) | | | | | |
| | | | | 20 MHz channel | | 40 MHz channel | | 80 MHz channel | |
| MCS index | Spatial streams | Moulation type | Coding rate | 800 ns GI | 400 ns GI | 800 ns GI | 400 ns GI | 800 ns GI | 400 ns GI |
| --- | --- | --- | --- | --- | --- | --- | --- | --- | --- |
| 0 | 1 | BPSK | 1/2 | 6.5 | 7.5 | 13.5 | 15 | 29.2 | 32.5 |
| 1 | 1 | QPSK | 1/2 | 13 | 14.4 | 27 | 30 | 58.5 | 65 |
| 2 | 1 | QPSK | 3/4 | 19.5 | 21.7 | 40.5 | 45 | 87.8 | 97.5 |
| 3 | 1 | 16-QAM | 1/2 | 26 | 28.9 | 54 | 60 | 117 | 130 |
| 4 | 1 | 16-QAM | 3/4 | 39 | 43.3 | 81 | 90 | 175.5 | 195 |
| 5 | 1 | 64-QAM | 2/3 | 52 | 57.8 | 108 | 120 | 234 | 260 |
| 6 | 1 | 64-QAM | 3/4 | 58.5 | 65 | 121.5 | 135 | 263.2 | 292.5 |
| 7 | 1 | 64-QAM | 5/6 | 65 | 72.2 | 135 | 150 | 292.5 | 325 |
| 8 | 1 | 256-QAM | 3/4 | 78 | 86.7 | 162 | 180 | 351 | 390 |
| 9 | 1 | 256-QAM | 5/6 | 86.7 | 96.3 | 180 | 200 | 390 | 433.3 |
| 0 | 2 | BPSK | 1/2 | 13 | 14.4 | 27 | 30 | 58.4 | 65 |
| 1 | 2 | QPSK | 1/2 | 26 | 28.9 | 54 | 60 | 117 | 130 |
| 2 | 2 | QPSK | 3/4 | 39 | 43.3 | 81 | 90 | 175.6 | 195 |
| 3 | 2 | 16-QAM | 1/2 | 52 | 57.8 | 108 | 120 | 234 | 260 |
| 4 | 2 | 16-QAM | 3/4 | 78 | 86.7 | 162 | 180 | 351 | 390 |
| 5 | 2 | 64-QAM | 2/3 | 104 | 115.6 | 216 | 240 | 468 | 520 |
| 6 | 2 | 64-QAM | 3/4 | 117 | 130 | 243 | 270 | 526.4 | 585 |
| 7 | 2 | 64-QAM | 5/6 | 130 | 144.4 | 270 | 300 | 585 | 650 |
| 8 | 2 | 256-QAM | 3/4 | 156 | 173.4 | 324 | 360 | 702 | 780 |
| 9 | 2 | 256-QAM | 5/6 | 173.4 | 192.6 | 360 | 400 | 780 | 866.6 |

Table 3 above may represent a wireless communication rate in various communication channels according to an embodiment.

Referring to Table. 3 above, seeing an example of NOA control using the above-mentioned description information 500, when the wireless communication rate between the electronic device 100 and the second external device 300, which refers to Table 3 above, is faster than the bus rate information 510 (e.g., 480 Mbps) according to the attribute information 520 (e.g., a mass storage device; MSD) or the device use information 530 (e.g., external hard drives, flash drives, memory cards, or the like), which corresponds to the of wireless communication between the electronic device 100 and the second external device 300 is faster than the calculated data transmission rate or data reception rate of the wired communication, the processor 150 may increase a time or ratio (1) of absence involved in NOA control. Alternatively, as various examples of controlling attributes for wireless communication, the processor 150 may directly control a rate of wireless communication with the second external device 300 or may control a bandwidth associated with performing wireless communication, other than the above-mentioned NOA control. For example, the processor 150 may control the wireless communication rate to correspond to a rate of wired communication with the first external device 200 (e.g., a bus rate supported by the first external device 200) or may control a bandwidth of the wireless communication, with reference to wireless communication rate information in various channels according to Table 3 above.

FIG. 6 is a drawing illustrating various data for the amount of power consumption saved upon NOA control of an electronic device according to an embodiment.

As described above, a processor (a processor 150 of FIG. 2A) of an electronic device (an electronic device 100 of FIG. 2A) may perform control of an NOA for wireless communication performed between the electronic device 100 and a second external device (a second external device 300 of FIG. 2A), based on at least one information (e.g., device descriptor information, configuration descriptor information, interface descriptor information, endpoint descriptor information, or the like) related to wired communication (e.g., USB communication) between the electronic device 100 and a first external device (e.g., a first external device 200 of FIG. 2A). According to an embodiment, the NOA control by the processor 150 may be caused by saving of the amount of power consumption of the electronic device 100 which supports WSB communication for the first external device 200 and the second external device 300. For example, when the rate of the wireless communication is relatively faster than a wired communication rate, the processor 150 may allow the wireless communication rate to correspond to the wired communication rate based on control of the NOA for the wireless communication, wireless communication rate control, wireless communication bandwidth control, or the like, thus reducing unnecessary power consumption of the electronic device 100 and the second external device 300.

Referring to first data 3 when the electronic device 100 receives data from the second external device 300 and second data 5 when the electronic device 100 transmits data to the second external device 300 based on performing wireless communication, when a wireless communication rate is adjusted to a specified value according to NOA control (or when the wireless communication rate corresponds to a wired communication rate depending on the NOA control), it may be identified that the amount of power consumption of the electronic device 100 after the NOA control is relatively more reduced than the amount of power consumption before the NOA control. In FIG. 6, the description is given on the basis of the saving of the amount of power consumption of the electronic device 100, but, similar to the electronic device 100, the amount of power consumption of the second external device 300 after the NOA control may also be reduced.

Furthermore, when based on the first data 3 and the second data 5, as the wireless communication rate is more limited according to the NOA control, a power consumption saving ratio of the electronic device 100 may be more increased. Furthermore, when based on the first data 3 and the second data 5, a lager gain for power consumption saving may occur when the electronic device 100 transmits data to the second external device 300 than when the electronic device 100 receives data from the second external device 300.

Seeing various examples of the above-mentioned WSB communication operation of the electronic device 100, the electronic device 100 may be connected with a TV as the first external device 200 through wired communication and may be connected with a smartphone as the second external device 300 through wireless communication. In this case, as the electronic device 100 supports WSB communication, the TV may recognize that it is wiredly connected with the smartphone. At this time, when a wired communication state with the electronic device 100 is not good as the TV is loaded, the electronic device 100 may control attributes (e.g., an NOA control or the like) for wireless communication for the smartphone on the basis of a rate of the wired communication.

In various embodiments, when a wired communication state with the TV is not good, the electronic device 100 may store data received from the TV in a memory (140 of FIG. 2A), may increase a rate of wireless communication with the smartphone during a specified time to transmit a certain amount of the data stored in the memory 140, and may control attributes (e.g., an NOA control or the like) of wireless communication with the smartphone when the specified time elapses. In various embodiments, the electronic device 100 may be wiredly connected with a PC as the first external device 200 and may be wirelessly connected with a smartphone as the second external device 300. When the PC supports only a specific wired communication mode (e.g., USB 2.0 communication or the like), the electronic device 100 may specify and perform wireless communication with the smartphone in a mode (e.g., Wi-Fi 2.4 GHz, Wi-Fi 60 GHz, or the like) corresponding to the wired communication mode.

An electronic device (e.g., an electronic device 100 of FIG. 2A) according to the above-mentioned various embodiments may include a housing, a universal serial bus (USB) connector (e.g., an input/output interface 130 of FIG. 2A) exposed through one region of the housing, a wireless communication circuitry (e.g., a second communication circuitry 120 of FIG. 2A) supporting short-range wireless communication, at least one processor (e.g., a processor 150 of FIG. 2A) electrically connected with the USB connector and the wireless communication circuitry, and a memory (e.g., a memory 140 of FIG. 2A) electrically connected with the processor.

According to various embodiments, the memory may store instructions, when executed, causing the at least one processor to, while the USB connector is connected with a first external device and while the wireless communication circuitry performs wireless communication with a second external device, determine a wired communication state with the first external device through the USB connector and adjust a power saving scheme for the wireless communication based at least in part on the determined state.

According to various embodiments, the wired communication state may include a first data transmission rate.

According to various embodiments, the instructions may cause the at least one processor to adjust the power saving scheme, when the wireless communication provides a second data transmission rate greater than the first data transmission rate.

According to various embodiments, the power saving scheme may include a notice of absence (NOA) protocol according to Wi-Fi peer to peer (P2P).

According to various embodiments, the instructions may cause the at least one processor to adjust at least one parameter among NOA descriptors of the NOA protocol.

According to various embodiments, the at least one parameter may include at least one of a count, a type, a duration, an interval, or a start time.

An electronic device (e.g., an electronic device 100 of FIG. 2A) supporting Wi-Fi serial bus (WSB) according to various embodiments may include a housing, an input/output interface (e.g., an input/output interface 130 of FIG. 2A) exposed through one region of the housing, a first communication circuitry (e.g., a first communication circuitry 110 of FIG. 2A) electrically connected with the input/output interface and supporting wired communication, a second communication circuitry (e.g., a second communication circuitry 120 of FIG. 2A) supporting short-range wireless communication, at least one processor (e.g., a processor 150 of FIG. 2A) electrically connected with the input/output interface, the first communication circuitry, and the second communication circuitry, and a memory (e.g., a memory 140 of FIG. 2A) electrically connected with the processor.

According to various embodiments, the memory may store instructions, when executed, causing the at least one processor to perform wired communication with a first external device via the input/output interface and the first communication circuitry, perform wireless communication with a second external device via the second communication circuitry, obtain at least one information associated with the wired communication from the first external device, determine whether to control a notice of absence (NOA) for the wireless communication based on at least a portion of the information, and control the NOA for the wireless communication when a specified condition is met between the wired communication and the wireless communication.

According to various embodiments, the at least one information associated with the wired communication may include a first communication rate.

According to various embodiments, the specified condition may include a condition where the wireless communication provides a second communication rate greater than the first communication rate.

According to various embodiments, the instructions may cause the at least one processor to obtain first communication rate information of the wired communication from the first external device and adjust at least one of a sleep count, a sleep period, a sleep duration, a sleep start time, or a sleep end time of the second communication circuitry as control of the NOA for the wireless communication, when the specified condition is met.

According to various embodiments, the instructions may cause the at least one processor to transmit information associated with sleep adjustment of the second communication circuitry to the second external device.

According to various embodiments, the instructions may cause the at least one processor to restore a state of the NOA to a state before control, when a specified time elapses from the control of the NOA for the wireless communication or when the wireless communication is not normally performed after the control of the NOA.

According to various embodiments, the instructions may cause the at least one processor to determine whether to control the NOA for the wireless communication at a time when data is transmitted or received between the first external device and the second external device.

According to various embodiments, the instructions may cause the at least one processor to exclude control of the NOA for the wireless communication, when the second external device includes real-time responsiveness in conjunction with transmitting or receiving data.

According to various embodiments, the electronic device may further include a display configured to output content associated with operation of at least one of the wired communication or the wireless communication.

According to various embodiments, the instructions may cause the at least one processor to output a user interface capable of receiving a control signal from a user in conjunction with controlling the NOA on the display.

Figure 7:
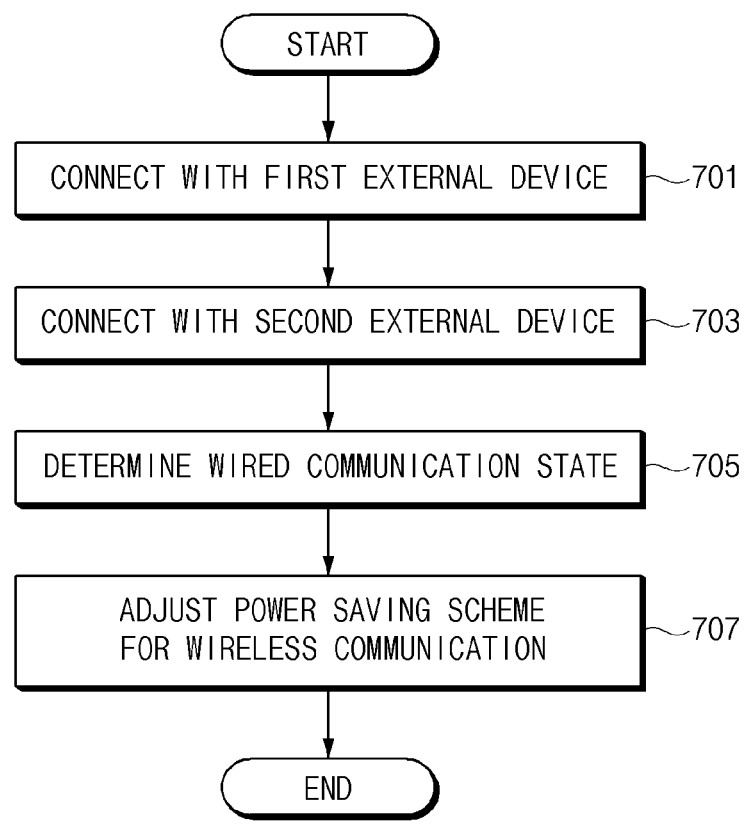
FIG. 7 is a drawing illustrating a method for adjusting a power saving scheme in an electronic device according to an embodiment.

FIG. 7 is a drawing illustrating a method for adjusting a power saving scheme in an electronic device according to an embodiment.

Referring to FIG. 7, in operation 701, an electronic device (an electronic device 100 of FIG. 2A) may be connected with a first external device (a first external device 200 of FIG. 2A). For example, the electronic device 100 may be physically connected with the first external device 200 based on an input/output interface (an input/output interface 130 of FIG. 2A) (e.g., a USB connector or the like) and may be connected with the first external device 200 through wired communication (e.g. USB connection) using a first communication circuitry (a first communication circuitry 110 of FIG. 2A) capable of being electrically connected to the input/output interface.

In operation 703, the electronic device 100 may be connected with a second external device (a second external device 300 of FIG. 2A). In this regard, the electronic device 100 may transmit a request to connect wireless communication to at least one adjacent external device (e.g., a second external device 300) and may receive a response according to the response from the adjacent device (e.g., the second external device 300). The electronic device 100 may include the at least one device (e.g., the second external device 300), which provides the response, in a Wi-Fi direct group. The electronic device 100 may be connected with the second external device 300, included in the Wi-Fi direct group, through wireless communication (e.g., Wi-Fi communication) using a second communication circuitry (a second communication circuitry 120 of FIG. 2A).

In operation 705, the electronic device 100 may determine a wired communication (e.g., USB communication) state with the first external device 200. For example, the electronic device 100 may obtain at least a portion of at least one descriptor information (e.g., a device descriptor, a configuration descriptor, an interface descriptor, an endpoint descriptor, or the like) related to the wired communication with the first external device 200 and may determine the wired communication state.

In operation 707, the electronic device 100 may adjust a power saving scheme for wireless communication. For example, when a rate of wireless communication (e.g., Wi-Fi communication) performed with the second external device 300 is relatively faster than a wired communication rate included in at least a portion of the wired communication state, the electronic device 100 may adjust a power saving scheme for wireless communication with the second external device 300. In an embodiment, the adjusting of the power saving scheme may include a series of processes of controlling the notice of absence (NOA) schedule based on an NOA protocol according to Wi-Fi peer to peer (P2P) with the second external device 300 and sharing and synchronizing the controlled NOA schedule with the second external device 300.

A communication control method of an electronic device supporting Wi-Fi serial bus (WSB) communication according to the above-mentioned various embodiments may include performing wired communication with a first external device, performing wireless communication with a second external device, obtaining at least one information associated with the wired communication from the first external device, determining whether to control a notice of absence (NOA) for the wireless communication based on at least a portion of the information, and controlling the NOA for the wireless communication when a specified first condition is met between the wired communication and the wireless communication.

According to various embodiments, the obtaining of the at least one information associated with the wired communication may include obtaining first communication rate information of the wired communication from the first external device.

According to various embodiments, the determining of whether to control the NOA for the wireless communication may include determining to control the NOA for the wireless communication, when the wireless communication provides a second communication rate greater than the first communication rate.

According to various embodiments, the determining of whether to control the NOA for the wireless communication may include excluding control of the NOA for the wireless communication, when the second external device includes real-time responsiveness in conjunction with transmitting or receiving data.

According to various embodiments, the controlling of the NOA for the wireless communication may include adjusting at least one of a sleep count, a sleep period, a sleep duration, a sleep start time, or a sleep end time of a communication circuit supporting the wireless communication.

According to various embodiments, the controlling of the NOA for the wireless communication may include transmitting information associated with sleep adjustment of the communication circuitry to the second external device.

According to various embodiments, the communication control method may further include restoring a state of the NOA to a state before control, when a specified time elapses from the control of the NOA for the wireless communication or when the wireless communication is not normally performed after the control of the NOA.

Figure 8:
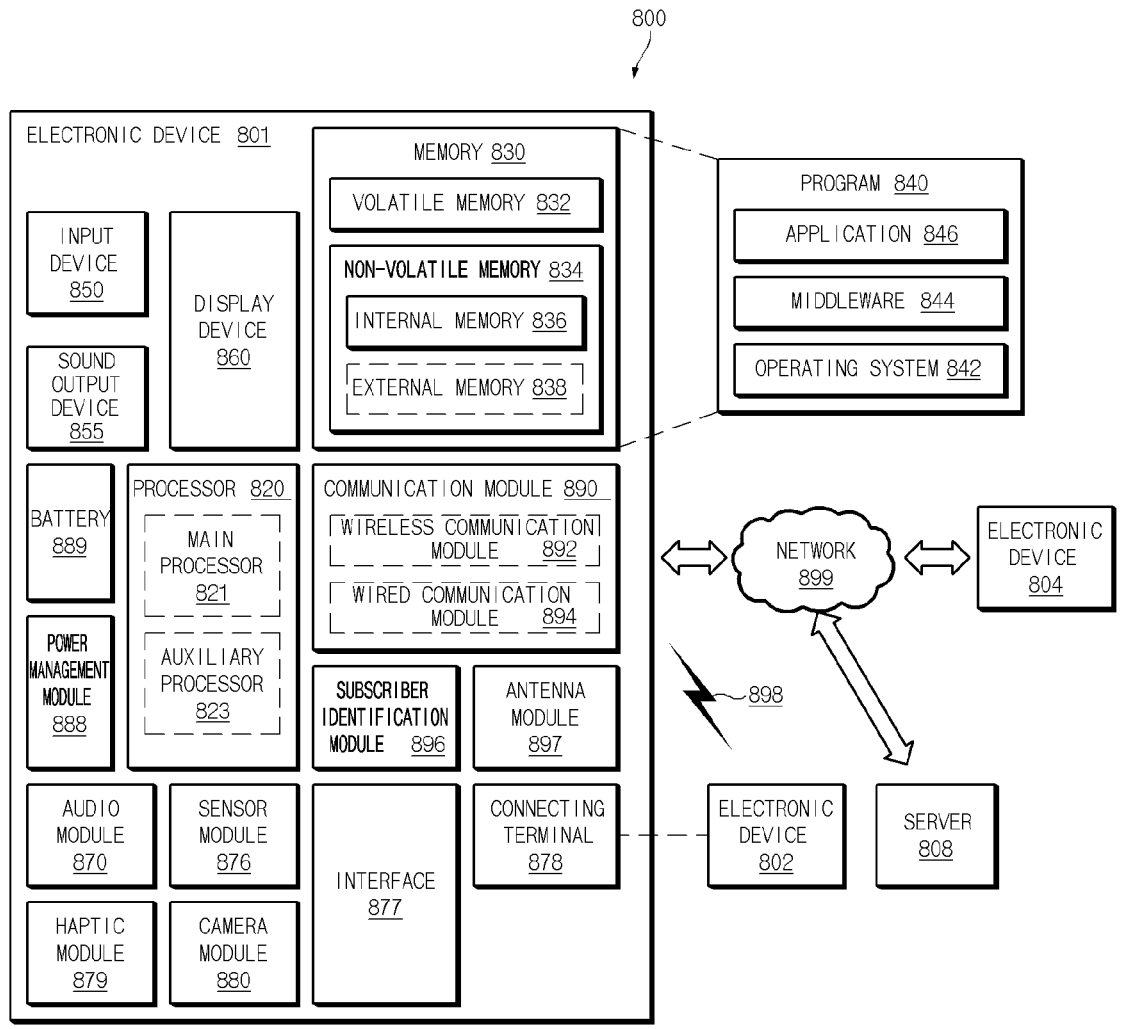
FIG. 8 is a drawing illustrating an electronic device in a network environment according to an embodiment.

FIG. 8 is a block diagram illustrating an electronic device 801 in a network environment 800 according to various embodiments. Referring to FIG. 8, the electronic device 801 in the network environment 800 may communicate with an electronic device 802 via a first network 898 (e.g., a short-range wireless communication network), or an electronic device 804 or a server 808 via a second network 899 (e.g., a long-range wireless communication network). According to an embodiment, the electronic device 801 may communicate with the electronic device 804 via the server 808. According to an embodiment, the electronic device 801 may include a processor 820, memory 830, an input device 850, a sound output device 855, a display device 860, an audio module 870, a sensor module 876, an interface 877, a haptic module 879, a camera module 880, a power management module 888, a battery 889, a communication module 890, a subscriber identification module (SIM) 896, or an antenna module 897. In some embodiments, at least one (e.g., the display device 860 or the camera module 880) of the components may be omitted from the electronic device 801, or one or more other components may be added in the electronic device 801. In some embodiments, some of the components may be implemented as single integrated circuitry. For example, the sensor module 876 (e.g., a fingerprint sensor, an iris sensor, or an illuminance sensor) may be implemented as embedded in the display device 860 (e.g., a display).

The processor 820 may execute, for example, software (e.g., a program 840) to control at least one other component (e.g., a hardware or software component) of the electronic device 801 coupled with the processor 820, and may perform various data processing or computation. According to one embodiment, as at least part of the data processing or computation, the processor 820 may load a command or data received from another component (e.g., the sensor module 876 or the communication module 890) in volatile memory 832, process the command or the data stored in the volatile memory 832, and store resulting data in non-volatile memory 834. According to an embodiment, the processor 820 may include a main processor 821 (e.g., a central processing unit (CPU) or an application processor (AP)), and an auxiliary processor 823 (e.g., a graphics processing unit (GPU), an image signal processor (ISP), a sensor hub processor, or a communication processor (CP)) that is operable independently from, or in conjunction with, the main processor 821. Additionally or alternatively, the auxiliary processor 823 may be adapted to consume less power than the main processor 821, or to be specific to a specified function. The auxiliary processor 823 may be implemented as separate from, or as part of the main processor 821.

The auxiliary processor 823 may control at least some of functions or states related to at least one component (e.g., the display device 860, the sensor module 876, or the communication module 890) among the components of the electronic device 801, instead of the main processor 821 while the main processor 821 is in an inactive (e.g., sleep) state, or together with the main processor 821 while the main processor 821 is in an active state (e.g., executing an application). According to an embodiment, the auxiliary processor 823 (e.g., an image signal processor or a communication processor) may be implemented as part of another component (e.g., the camera module 880 or the communication module 890) functionally related to the auxiliary processor 823.

The memory 830 may store various data used by at least one component (e.g., the processor 820 or the sensor module 876) of the electronic device 801. The various data may include, for example, software (e.g., the program 840) and input data or output data for a command related thereto. The memory 830 may include the volatile memory 832 or the non-volatile memory 834.

The program 840 may be stored in the memory 830 as software, and may include, for example, an operating system (OS) 842, middleware 844, or an application 846.

The input device 850 may receive a command or data to be used by other component (e.g., the processor 820) of the electronic device 801, from the outside (e.g., a user) of the electronic device 801. The input device 850 may include, for example, a microphone, a mouse, or a keyboard.

The sound output device 855 may output sound signals to the outside of the electronic device 801. The sound output device 855 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 860 may visually provide information to the outside (e.g., a user) of the electronic device 801. The display device 860 may include, for example, a display, a hologram device, or a projector and control circuitry to control a corresponding one of the display, hologram device, and projector. According to an embodiment, the display device 860 may include touch circuitry adapted to detect a touch, or sensor circuitry (e.g., a pressure sensor) adapted to measure the intensity of force incurred by the touch.

The audio module 870 may convert a sound into an electrical signal and vice versa. According to an embodiment, the audio module 870 may obtain the sound via the input device 850, or output the sound via the sound output device 855 or a headphone of an external electronic device (e.g., an electronic device 802) directly (e.g., wiredly) or wirelessly coupled with the electronic device 801.

The sensor module 876 may detect an operational state (e.g., power or temperature) of the electronic device 801 or an environmental state (e.g., a state of a user) external to the electronic device 801, and then generate an electrical signal or data value corresponding to the detected state. According to an embodiment, the sensor module 876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 877 may support one or more specified protocols to be used for the electronic device 801 to be coupled with the external electronic device (e.g., the electronic device 802) directly (e.g., wiredly) or wirelessly. According to an embodiment, the interface 877 may include, for example, a high definition multimedia interface (HDMI), a universal serial bus (USB) interface, a secure digital (SD) card interface, or an audio interface.

A connecting terminal 878 may include a connector via which the electronic device 801 may be physically connected with the external electronic device (e.g., the electronic device 802). According to an embodiment, the connecting terminal 878 may include, for example, a HDMI connector, a USB connector, a SD card connector, or an audio connector (e.g., a headphone connector), The haptic module 879 may convert an electrical signal into a mechanical stimulus (e.g., a vibration or a movement) or electrical stimulus which may be recognized by a user via his tactile sensation or kinesthetic sensation. According to an embodiment, the haptic module 879 may include, for example, a motor, a piezoelectric element, or an electric stimulator.

The camera module 880 may capture a still image or moving images. According to an embodiment, the camera module 880 may include one or more lenses, image sensors, image signal processors, or flashes.

The power management module 888 may manage power supplied to the electronic device 801. According to one embodiment, the power management module 888 may be implemented as at least part of, for example, a power management integrated circuit (PMIC).

The battery 889 may supply power to at least one component of the electronic device 801. According to an embodiment, the battery 889 may include, for example, a primary cell which is not rechargeable, a secondary cell which is rechargeable, or a fuel cell.

The communication module 890 may support establishing a direct (e.g., wired) communication channel or a wireless communication channel between the electronic device 801 and the external electronic device (e.g., the electronic device 802, the electronic device 804, or the server 808) and performing communication via the established communication channel. The communication module 890 may include one or more communication processors that are operable independently from the processor 820 (e.g., the application processor (AP)) and supports a direct (e.g., wired) communication or a wireless communication. According to an embodiment, the communication module 890 may include a wireless communication module 892 (e.g., a cellular communication module, a short-range wireless communication module, or a global navigation satellite system (GNSS) communication module) or a wired communication module 894 (e.g., a local area network (LAN) communication module or a power line communication (PLC) module). A corresponding one of these communication modules may communicate with the external electronic device via the first network 898 (e.g., a short-range communication network, such as Bluetooth™, wireless-fidelity (Wi-Fi) direct, or infrared data association (IrDA)) or the second network 899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 892 may identify and authenticate the electronic device 801 in a communication network, such as the first network 898 or the second network 899, using subscriber information (e.g., international mobile subscriber identity (IMSI)) stored in the subscriber identification module 896.

The antenna module 897 may transmit or receive a signal or power to or from the outside (e.g., the external electronic device) of the electronic device 801. According to an embodiment, the antenna module 897 may include one or more antennas, and, therefrom, at least one antenna appropriate for a communication scheme used in the communication network, such as the first network 898 or the second network 899, may be selected, for example, by the communication module 890 (e.g., the wireless communication module 892). The signal or the power may then be transmitted or received between the communication module 890 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 801 and the external electronic device 804 via the server 808 coupled with the second network 899. Each of the electronic devices 802 and 804 may be a device of a same type as, or a different type, from the electronic device 801. According to an embodiment, all or some of operations to be executed at the electronic device 801 may be executed at one or more of the external electronic devices 802, 804, or 808. For example, if the electronic device 801 should perform a function or a service automatically, or in response to a request from a user or another device, the electronic device 801, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 801. The electronic device 801 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance.

According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 840) including one or more instructions that are stored in a storage medium (e.g., internal memory 836 or external memory 838) that is readable by a machine (e.g., the electronic device 801). For example, a processor (e.g., the processor 820) of the machine (e.g., the electronic device 801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device supporting Wi-Fi serial bus (WSB) communication, the electronic device comprising:
   a housing;
   an input/output interface exposed through one region of the housing;
   a first communication circuitry electrically connected with the input/output interface and supporting wired communication;
   a second communication circuitry supporting short-range wireless communication;
   at least one processor electrically connected with the input/output interface, the first communication circuitry, and the second communication circuitry; and
   a memory electrically connected with the processor,
   wherein the memory stores instructions, when executed, causing the at least one processor to:
      perform wired communication with a first external device via the input/output interface and the first communication circuitry and perform wireless communication with a second external device via the second communication circuitry;
      obtain at least one information associated with the wired communication from the first external device;
      determine whether to control a notice of absence (NOA) for the wireless communication based on at least a portion of the information; and
      control the NOA for the wireless communication, when a specified condition is met between the wired communication and the wireless communication.

2. The electronic device of claim 1, wherein the at least one information associated with the wired communication includes a first communication rate, and
   wherein the specified condition includes a condition where the wireless communication provides a second communication rate greater than the first communication rate.

3. The electronic device of claim 1, wherein the instructions cause the at least one processor to:
   obtain first communication rate information of the wired communication from the first external device; and adjust at least one of a sleep count, a sleep period, a sleep duration, a sleep start time, or a sleep end time of the second communication circuitry as control of the NOA for the wireless communication, when the specified condition is met.

4. The electronic device of claim 3, wherein the instructions cause the at least one processor to:
transmit information associated with sleep adjustment of the second communication circuitry to the second external device.

5. The electronic device of claim 1, wherein the instructions cause the at least one processor to:
restore a state of the NOA to a state before control, when a specified time elapses from the control of the NOA for the wireless communication or when the wireless communication is not normally performed after the control of the NOA.

6. The electronic device of claim 1, wherein the instructions cause the at least one processor to:
determine whether to control the NOA for the wireless communication at a time when data is transmitted or received between the first external device and the second external device.

7. The electronic device of claim 1, wherein the instructions cause the at least one processor to:
exclude control of the NOA for the wireless communication, when the second external device includes real-time responsiveness in conjunction with transmitting or receiving data.

8. The electronic device of claim 1, further comprising:
a display configured to output content associated with operation of at least one of the wired communication or the wireless communication,
wherein the instructions cause the at least one processor to:
output a user interface capable of receiving a control signal from a user in conjunction with controlling the NOA on the display.

9. A communication control method of an electronic device supporting Wi-Fi serial bus (WSB) communication, the method comprising:
performing wired communication with a first external device;
performing wireless communication with a second external device;
obtaining at least one information associated with the wired communication from the first external device;
determining whether to control a notice of absence (NOA) for the wireless communication based on at least a portion of the information; and
controlling the NOA for the wireless communication, when a specified first condition is met between the wired communication and the wireless communication.

10. The method of claim 9, wherein the obtaining of the at least one information associated with the wired communication includes:
obtaining first communication rate information of the wired communication from the first external device.

11. The method of claim 10, wherein the determining of whether to control the NOA for the wireless communication includes:
determining to control the NOA for the wireless communication, when the wireless communication provides a second communication rate greater than a first communication rate.

12. The method of claim 9, wherein the determining of whether to control the NOA for the wireless communication includes:
excluding control of the NOA for the wireless communication, when the second external device includes real-time responsiveness in conjunction with transmitting or receiving data.

13. The method of claim 9, wherein the controlling of the NOA for the wireless communication includes:
adjusting at least one of a sleep count, a sleep period, a sleep duration, a sleep start time, or a sleep end time of a communication circuit supporting the wireless communication.

14. The method of claim 13, wherein the controlling of the NOA for the wireless communication includes:
transmitting information associated with sleep adjustment of the communication circuit to the second external device.

15. The method of claim 9, further comprising:
restoring a state of the NOA to a state before control, when a specified time elapses from the control of the NOA for the wireless communication or when the wireless communication is not normally performed after the control of the NOA.

* * * * *